March 5, 1957
C. H. SMOOT
2,783,768
PRESSURE TRANSMITTERS
Filed April 27, 1953
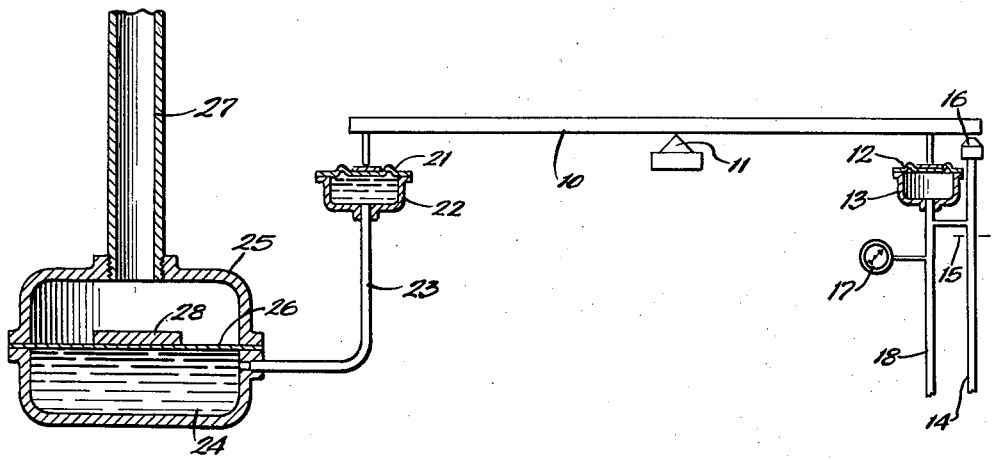
INVENTOR.
Charles H. Smoot,
BY
Bair, Freeman & Molinare
ATTORNEYS.

United States Patent Office 2,783,768
Patented Mar. 5, 1957

2,783,768

PRESSURE TRANSMITTERS

Charles H. Smoot, Chicago, Ill., assignor to Republic Flow Meters Company, Chicago, Ill., a corporation of Illinois Application April 27, 1953, Serial No. 351,352

2 Claims. (Cl. 137—85)

This invention relates to pressure transmitters and more particularly to an instrument producing a pressure for effecting an indicating or control operation in response to changes in a high vacuum.

Certain operations require the production of indicating or control impulses in response to changes in a very high vacuum or low absolute pressure. In cases which involve a corrosive or noxious fluid it is desirable to keep such fluids out of the instrument, first, to prevent corrosion of the instrument parts and, secondly, to eliminate the possibility of leakage.

It has been proposed to fill the sensing parts of the instrument with a liquid such as oil or the like to act as a seal between the instrument and the corrosive fluid and to transfer changes in pressure of the fluid to the instrument. It has been found, however, that with the very low pressures encountered, and especially when such low pressures are coupled with relatively high temperatures, gassing of the liquid is produced. This may be due to volitalization of some of the components or to entrained air, but in either case when gassing occurs the accuracy of the instrument will be destroyed. Efforts to find a liquid suitable for transferring the pressure changes to the instrument and which are not subject to gassing have not met with success.

It is one of the objects of the present invention to provide a pressure transmitter in which a column of liquid is utilized to transfer pressure changes to the instrument and which is maintained under a pressure substantially higher than that to be measured to eliminate gassing.

Another object is to provide a pressure transmitter in which the column of liquid is confined to a closed space closed at two points by flexible diaphragms one of which acts on the instrument and the other of which is subjected to the pressure to be measured and in which a weight acts on the second diaphragm to maintain the column of liquid under pressure.

The above and other objects and features of the invention will be more readily apparent from the following description when read in connection with the accompanying drawing in which the single figure is a diagrammatic view of a pressure transmitter embodying the invention.

The transmitter, as shown, may be constructed substantially as more particularly described and claimed in the patent to Rosenberger, No. 2,431,200. As illustrated diagrammatically, the instrument comprises a balance beam pivoted intermediate its end on a fixed pivot 11. The beam is urged counter-clockwise by pressure acting on a flexible diaphragm 12 which is connected to one end of the beam and which closes one side of a chamber 13. Fluid under pressure, such as air, is supplied through an inlet conduit 14 past a restriction 15 to the chamber 13 and to a nozzle 16 which is positioned beneath one end of the beam to be variably restricted thereby. The pressure in the nozzle will be regulated by movement of the beam to vary the pressure on the diaphragm 12 and may be measured by an indicating instrument 17. The pressure may also be transmitted through a conduit 18 to effect any desired control operation.

The beam is urged in the opposite direction by a flexible diaphragm 21 closing one side of a chamber 22. The chamber 22 is connected by a pipe 23 to a chamber 24 formed in one side of a casing 25 which is divided by a flexible diaphragm 26. Since very little movement of the diaphragm 26 is required, it may be formed of a flat sheet of material which is capable of resisting the corrosive effect of the fluid to be measured. While many materials are satisfactory for this purpose, the diaphragm may, for example, be formed of silver, platinum, titanium, or the like, and is preferably on the order of only a few thousandths of an inch thick so that it can flex to the slight extent required very easily.

The upper end of the casing 25 above the diaphragm 26 is connected by a conduit 27 to a source of the pressure to be measured. It will be understood that the casing 25 and the conduit 27 which are exposed to the corrosive fluid may be made from or lined with a material which will resist the corrosive effects of the fluid.

Pressure of the fluid acting on the diaphragm 26 is transmitted to the diaphragm 21 by filling the chambers 22 and 24 and the conduit 23 with a liquid such as oil. The space defined by the chambers and conduit is completely filled and the oil is treated to remove entrained air therefrom as completely as possible. It has been found, however, that even when the oil is completely sealed in the closed space, pressures on the order of 10 microns absolute, and especially when temperatures above about 150° F. are encountered, will cause the oil to gas and destroy the accuracy of the instrument. To avoid this effect a weight, such as a piece of lead or similar inert material, as shown at 28, is placed on the upper surface of the diaphragm 26. This weight loads the diaphragm and will maintain the column of oil under a pressure substantially higher than that in the conduit 27 so that the oil will not gas. It will be understood that any desired value of the weight can be chosen and that the pressure produced on the diaphragm 21 by the weight may be compensated for in adjusting and calibrating the instrument.

With this construction, the column of oil is maintained at all times under a pressure high enough to eliminate gassing. Therefore, changes of pressure in the conduit 27 will be accurately transmitted to the instrument under all operating conditions without interference due to gassing. At the same time, the corrosive fluid in the conduit 27 is kept away from the instrument and may, in fact, be kept completely out of the room in which the instrument is housed to eliminate any danger from leakage.

While one embodiment of the invention has been shown and described, it will be understood that this is illustrative only and is not to be taken as a definition of the scope of the invention, reference being had for this purpose to the appended claims.

What is claimed is:

1. A pressure transmitter comprising a balance member, means controlled by movement of the balance member to produce a regulated force, means responsive to the regulated force acting on the member to urge it in one direction, a first chamber closed at one side by a flexible diaphragm, a connection between the diaphragm and the balance member to urge the balance member in the other direction in response to pressure in the chamber, a second chamber closed at one side by a flexible diaphragm, a connection between the chambers forming therewith a closed fluid space filled with liquid, a casing inclosing the outer side of the flexible diaphragm closing the second chamber, a connection to the casing subject to a relatively high vacuum, and a weight acting on the last named diaphragm to maintain the liquid in said closed fluid space under a higher absolute pressure than the absolute pressure in the last named connection.

2. A pressure transmitter comprising a balance member, means controlled by movement of the balance member to produce a regulated force, means responsive to the regulated force acting on the member to urge it in one direction, a first chamber closed at one side by a flexible diaphragm, a connection between the diaphragm and the balance member to urge the balance member in the other direction in response to pressure in the chamber, a second chamber divided by a flat metallic diaphragm, a connection between the second chamber at one side of the diaphragm and the first chamber forming therewith a closed fluid space filled with liquid, a connection to the second chamber at the other side of the diaphragm subject to a relatively high vacuum, and a weight acting on the flat metallic diaphragm to produce a pressure thereon toward the closed fluid space to maintain the liquid in the closed fluid space under a higher absolute pressure than the absolute pressure in the last named connection.

References Cited in the file of this patent

UNITED STATES PATENTS

| | | |
|---|---|---|
| 509,625 | Nagle | Nov. 28, 1893 |
| 1,289,963 | Thomson | Dec. 31, 1918 |
| 1,976,313 | Wenzel | Oct. 9, 1934 |
| 2,362,338 | Anderson | Nov. 7, 1944 |
| 2,461,026 | Bilyeu | Feb. 8, 1949 |
| 2,557,021 | Williams | June 12, 1951 |